US005414935A

United States Patent [19]

Braunbach et al.

[11] Patent Number: 5,414,935

[45] Date of Patent: May 16, 1995

[54] HAND POWER TOOL WITH TURNABLE BASE PLATE

[75] Inventors: Karl-Heinz Braunbach, Leinfelden-Echterdingen; Adolf Zaiser, Koengen; Hans Bloechle, Stuttgart; Thomas Demuth, Marbach, all of Germany

[73] Assignee: Robert Bosch GmbH, Stuttgart, Germany

[21] Appl. No.: 160,476

[22] Filed: Dec. 1, 1993

Related U.S. Application Data

[63] Continuation of Ser. No. 918,280, Jul. 22, 1992, abandoned.

[30] Foreign Application Priority Data

Jul. 22, 1991 [DE] Germany ........................ 41 24 231.9

[51] Int. Cl.[6] ........................ B23D 45/16; B27B 9/00; B27B 9/02; B27G 19/04

[52] U.S. Cl. ........................................ 30/376; 30/390

[58] Field of Search .................................. 30/375–377, 30/388–391, 275

[56] References Cited

U.S. PATENT DOCUMENTS 2,657,719 3/1953 Forsberg .

FOREIGN PATENT DOCUMENTS 404107 10/1924 Germany ............................. 30/376

3615848 11/1987 Germany .

*Primary Examiner*—Douglas D. Watts

*Attorney, Agent, or Firm*—Michael J. Striker

[57] ABSTRACT

A motor driven hand power tool has a saw including a saw blade, a separating tool formed as a saw blade movable about a tilting axis extending parallel to a cutting line of sight and fixable in each turning position relative to a workpiece which is subdivided by a cutting joint into a product-side and a refuse-side with product and refuse-side cutting edges, a base plate over which the saw blade is positioned. The saw blade is arranged so that the tilting axis extends at a distance under a lower side of the base plate, and the distance is dimensioned so that the tilting axis in a working position of the power tool is located under an upper surface of the workpiece in an interior of the workpiece.

18 Claims, 5 Drawing Sheets

HAND POWER TOOL WITH TURNABLE BASE PLATE

This is a continuation of application Ser. No. 918,280, filed Jul. 22, 1992, now abandoned.

BACKGROUND OF THE INVENTION

The present invention to a hand power tool with a turnable base plate.

More particularly, it relates to a motor driven hand power tool for separating works,especially a hand circular saw with a height adjustment for selecting a cutting depth and a cutting element movable about a turning axis and fixable in each turning position.

A hand power tool of the above mentioned general type is known in the art. One of such hand power tools is disclosed for example in the German document DE-PS 743,056. It is turnably connected with a base plate through a hinge-like turning-guiding means. The physical turning (or tilting) axle formed by the turning-guiding means is arranged on the base plate so that it is located approximately on the upper surface of the workpiece. Therefore the cutting edges during all turning angle positions of the hand held power tool are approximately congruent and lie in a common line of sight of the cutting edge indicator.

With the above described arrangement it can be achieved when the turning axis extends directly on the workpiece surface in the cutting line between the plane of the base plate-abutment surface and the tool plane, with the tool extending perpendicular to the abutment surface. This was obvious to persons skilled in the art by means of simple geometrical considerations before the present application for the protection. Possibly it was not substantially meaningful to realize or to discuss the approximate solution with physical turning axle. The approximate solution was developed further, and the physical hinge axle was replaced by a non-physical turning axle in form of a coulisse-like turning guiding member. This was developed in 1981 with the wood hand circular saw 2117 t 65 i and 2118 t 85 i. Their coulisse guides form non-physical turning axes extending under the base plate, and the center point of the circular guiding path or cutting line lie between the plane of tile base plate abutment surface and the tool plane. Thereby an accurate coincidence of the cutting edges in all turning angular positions is obtained.

During works with a guiding rail there is the disadvantage that the turning axis extends above the workpiece surface and it is placed in parallel by the thickness of the guiding rail. This disadvantage is shown in the German document DE-OS 3,615,848, without means with which the turning axis must be adjustable with or without the use of the guiding rail.

A further hand circular saw is disclosed in the German document DE-OS 3,445,431 there is an adjusting screw on the side which is opposite to the pivot bearing. The saw blade can be practically turnable about the pivot bearing and transverse to the feed direction in a small angular region by means of the adjusting screw. Thereby the parallel position of the saw blade to the feed direction can be obtained when it assumes an inclined position due to unfavorable tolerance adding. It is provided and assumed that when a parallel deviation of the saw blade from the nominal position is not corrected. None of the hand tools eliminates the above mentioned disadvantageous property.

A further disadvantage is that the separating tool is not adjustable in uncoupled position from the turning axis. Thereby during adjustment of the angular position of the tool it is unavoidable that the position of the tool relative to the turning axis is adjusted so that despite the parallel position of the tool relative to the feed direction, the results of the inclined position of the tool to the turning axis is worse than it was before: parallel displaced cutting joints during changes of the turning angle, inclined cut to the feed direction at turning angle 45°, tool contact with the guiding arm. The cutting line of sight thereby cannot be practically determined. In the worse case the separating tool can destroy the guiding rail.

This further disadvantage is avoided in accordance with the solution disclosed in the German document DE-OS 3,243,564. Here a wrapper lip which is mounted with a considerable extension on the guiding rail and acts as a cutting line of sight and chip breaker, is cut during the first cut with the separating tool. Thereby an error compensating pair hand tool/guiding rail can be formed. The error compensation is effective only between the pairs which are fixedly arranged relative to one another, with a low wear, practically only in a new position. It is for example eliminated during the exchange of an old saw blade for a new saw blade with a mass which deviates from the first saw blade. The error during a separation of a error compensating pair can be greater than new hand power tools of the same type with an already "cut" old guiding rail is used: the cutting edge of the rubber lip can be located in an unfavorable case so that, outside the regional pair, neither the function of the guiding rail as a chip breaker nor a cutting line of sight can be provided. This danger is characteristic especially for hand tool operations with several, same-type machines of the same manufacture.

Such errors have been accepted until now. They were not compensatable with efficient expenses and occurred from the power tool to the power tool more or less in the band width of the tolerance play. Thus, for example in hand circular saws a tolerance play of the parallel position of the saw blade is conventionally to be approximately ±1 mm. This great tolerance width results from the requirement that individual parts distributed over the mass chain are cost favorable to manufacture and from the assumption that the cost optimization was favorable to the accuracy.

SUMMARY OF THE INVENTION

Accordingly, it is an object of the present invention to provide a hand power tool which avoids the disadvantages of the prior art.

In keeping with these objects and with others which will become apparent hereinafter, one feature of the present invention resides, briefly stated, in a hand power tool in which the non-physical turning (tilting) axis extends at a distance under the base plate and the distance is determined so that the turning axis with the hand power tool placed in the working position on the workpiece is located under the surface of the workpiece or in other words in the interior of the workpiece.

When the hand power tool is designed in accordance with the present invention it avoids the disadvantages of the prior art hand power tools and the working quality obtained with it with or without a guiding rail is substantially higher. The position of the turning axis inside the workpiece is determinable and adjustable very accurately. Thereby uniform trace of the cutting joint in all turning angular positions and a high-accurate cutting line of sight is possible. The fixed pair of formation of each hand power tool with each guiding rail is unnecessary. Size deviations of the hand power tool resulting from manufacture are correctable during the hand mounting.

The hand power tool has adjusting means which in cooperation with the turning axis do not limit the present invention to a turning bridge but instead it is an advantageous example. Analogously the advantageous use of the adjusting means without the turning bridge is possible as well.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
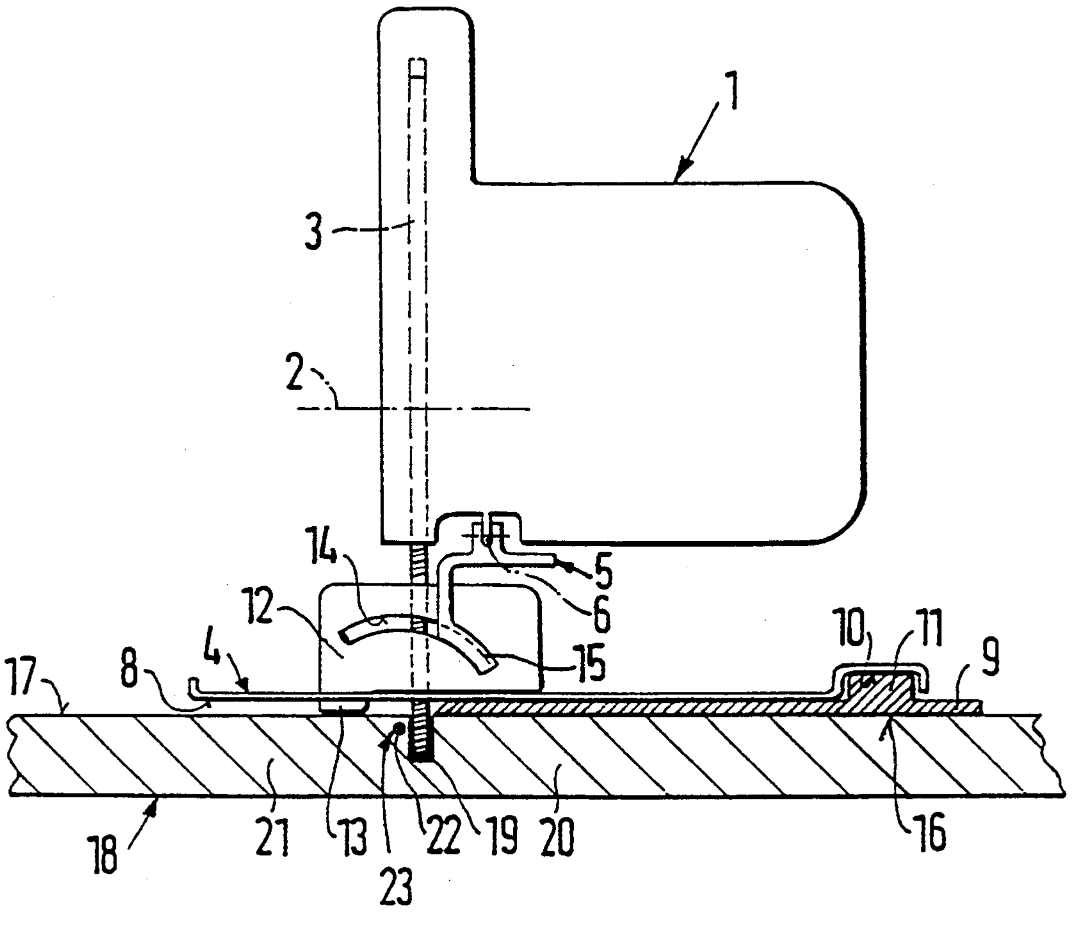
FIG. 1 is a view schematically showing a hand circular saw with a guiding rail in a working position.

A not completely shown hand circular saw is illustrated in FIG. 1 and identified with reference numeral 1. It has a saw blade 3 which is rotatable about an axis 2 and is turnable on a base plate 4 through a turning bridge 5 together with it relative to the base plate. It is vertically turnably mounted in a pin bearing 6 for adjusting the cutting depth. The hand circular saw 1 is arranged with a lower side side 8 of its base plate 4 on a guiding rail 9. The base plate 4 has a longitudinal edge extending parallel to the feed direction and provided with a guiding groove 10 for engaging with a guiding rib 11 of the guiding rail 9. The base plate 4 also carries a guiding coulisse sheet 12 with a projecting abutment 13 and with a circular arc-shaped coulisse guiding path 14. A coulisse block-like end 15 of the turning bridge 5 is guided in the guiding path 14.

The guiding rail 9 lies with its lower side 16 on an upper surface 17 of a flat workpiece 18. The workpiece 18 has a cutting joint 19 produced by the saw blade 3. The cutting joint 19 subdivides the workpiece 11 into a product side 20 and a refuse side 21. The intersecting radii of the coulisse guiding path 14 geometrically defines an intersecting point 22 of a non-physical virtual turning (or tilting) axis 23 in a plane perpendicular to the feed direction or in other words, in the plane of the drawings. It is located in the workpiece 18 substantially under its upper surface 17.

Figure 2:
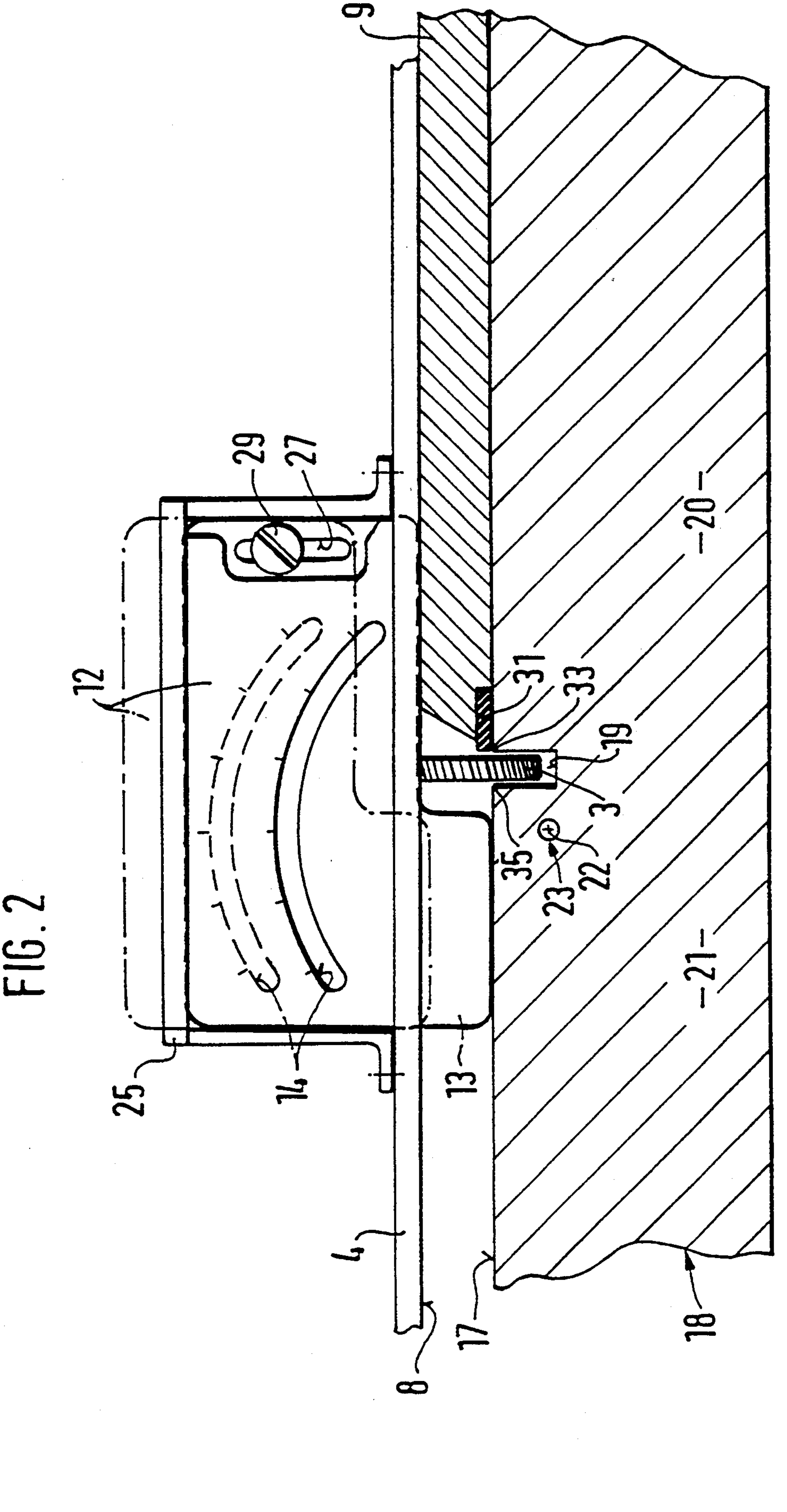
FIG. 2 is a view showing a guiding coulisse region of FIG. 1 on an enlarged scale as an individual unit.

The guiding coulisse region of the hand circular saw 1 of FIG. 1 is shown in FIG. 2 on an enlarged scale and clearly illustrates the design of the guiding coulisse sheet 12. The guiding coulisse sheet 12 is supported in height-adjustable manner in a slider frame 22 which is preferably on the base plate 4. The screwing is not shown in detail. Through an abutment 13 which must lie on the upper surface 17 of the workpiece, the turning axis 23 by working with or without the guiding rail 9 is adjustable in a predetermined height position. The respectively adjusted height position is arrestable by means of an adjusting screw 29 which is screwed in an elongated hole 26 located in the guiding coulisse sheet 12. The coulisse guiding path 14 shown in thick lines corresponds to positions of the guiding coulisse 19 during use of a guiding rail 9. The coulisse guiding path 14 shown in a broken line corresponds to the position of the guiding coulisse 12 without the use of the guiding rail 9.

The position of the intersection point 22 of the turning (tilting) axis 23 through the workpiece 11 at a distance under its upper surface 17 can be clearly seen, as well as the small distance of the saw blade 3 to the end side or to a rubber lip 31 of the guiding rail 9. The width of the cutting joint 19 is limited in the workpiece 18 by a product-side and a refuse-side cutting edges 33 and 35, respectively.

Figure 3:
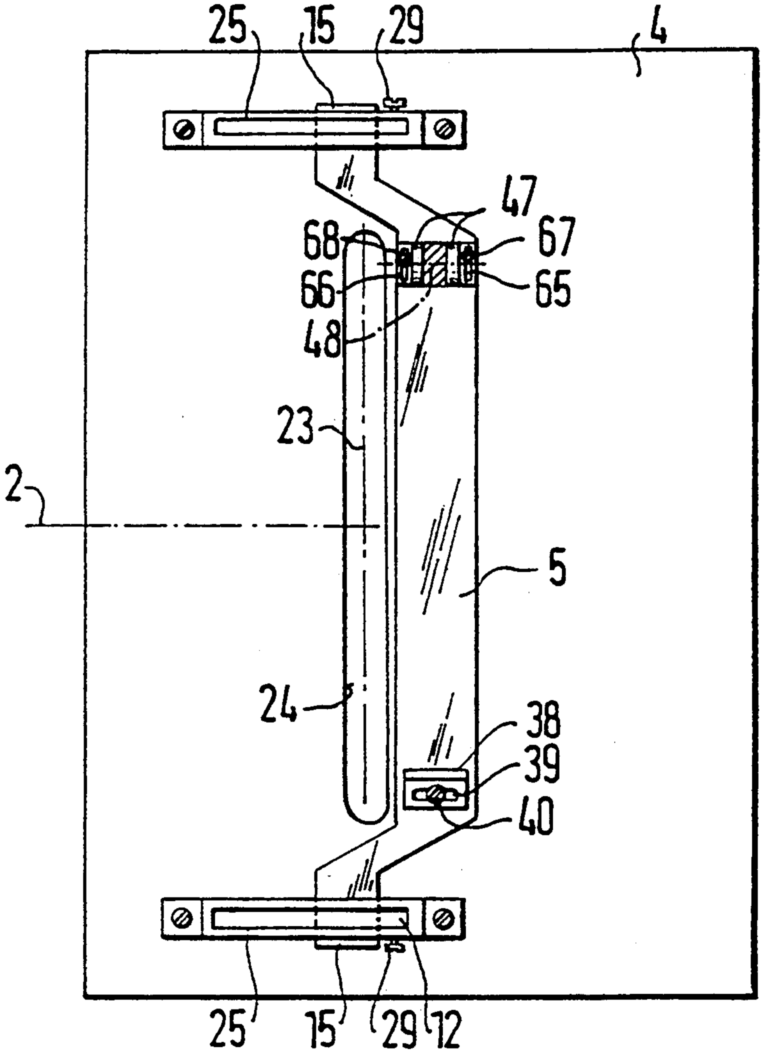
FIG. 3 is a plan view of the example of the hand circular saw of FIG. 1.

FIG. 3 shows a plan view of the embodiment of FIGS. 1 and 2 and illustrate a double arrangement of the parts on the base plate 4 symmetrically to the axis 2 of the saw shaft, as considered in the feed direction. In particular the parts include the guiding coulisse sheets 12, the slider frame 25 with adjusting screws 29, two coulisse block like extensions 15 of the turning bridge 5 which are located at opposite sides and supported in the guiding coulisse sheets 12. Moreover, this Figure also shows the arrangement of a bearing block 47 with a pin bearing 46 which is adjustable through elongated holes 65, 66 and screws 67, 68 on the turning bridge 5 as well as the arrangement of a cutting depth guiding arm 38 which is also adjustable through an elongated hole 39 and a screw 40 on the turning bridge 50. The position of the turning axis 23 inside the throughgoing opening 24 with respect to the base plate 4 is also shown.

Figure 4:
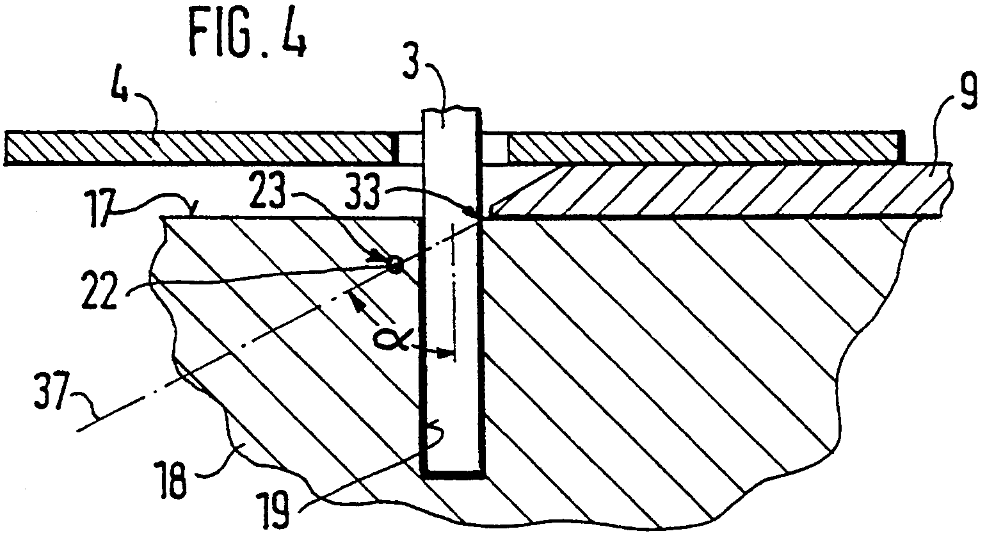
FIG. 4 is a principle diagram of the geometry of the inventive power tool.

FIG. 4 shows the geometrically favorable possible region in which the turning axis 23 can be arranged. The turning axis geometry is shown schematically and on an enlarged scale. The base plate 4 is located on the guiding rail 9 and the guiding rail is located on the workpiece 18. The saw blade 3 extends in a cutting joint 19 in the workpiece 18. A structurally determined geometrically defined ray 37 extends in the plane of the drawings through the upper, product-side cutting edge 33 of the cutting joint 19, underneath the surface 17, at an angle of 67.5° relative to the saw blade 3.

The turning axis 23 must be arranged on the rail 37, possibly in the cutting joint 19, in particular near the cutting edge 33. It extends at least approximately 1–2 mm under the upper surface 17. When this condition is fulfilled the saw blade 3 does not contact the guiding rail 9 with reliability at turning angles between 19° and 45°. With all turning angles, identical cutting edges 33 and 35 are produced.

Figure 5:
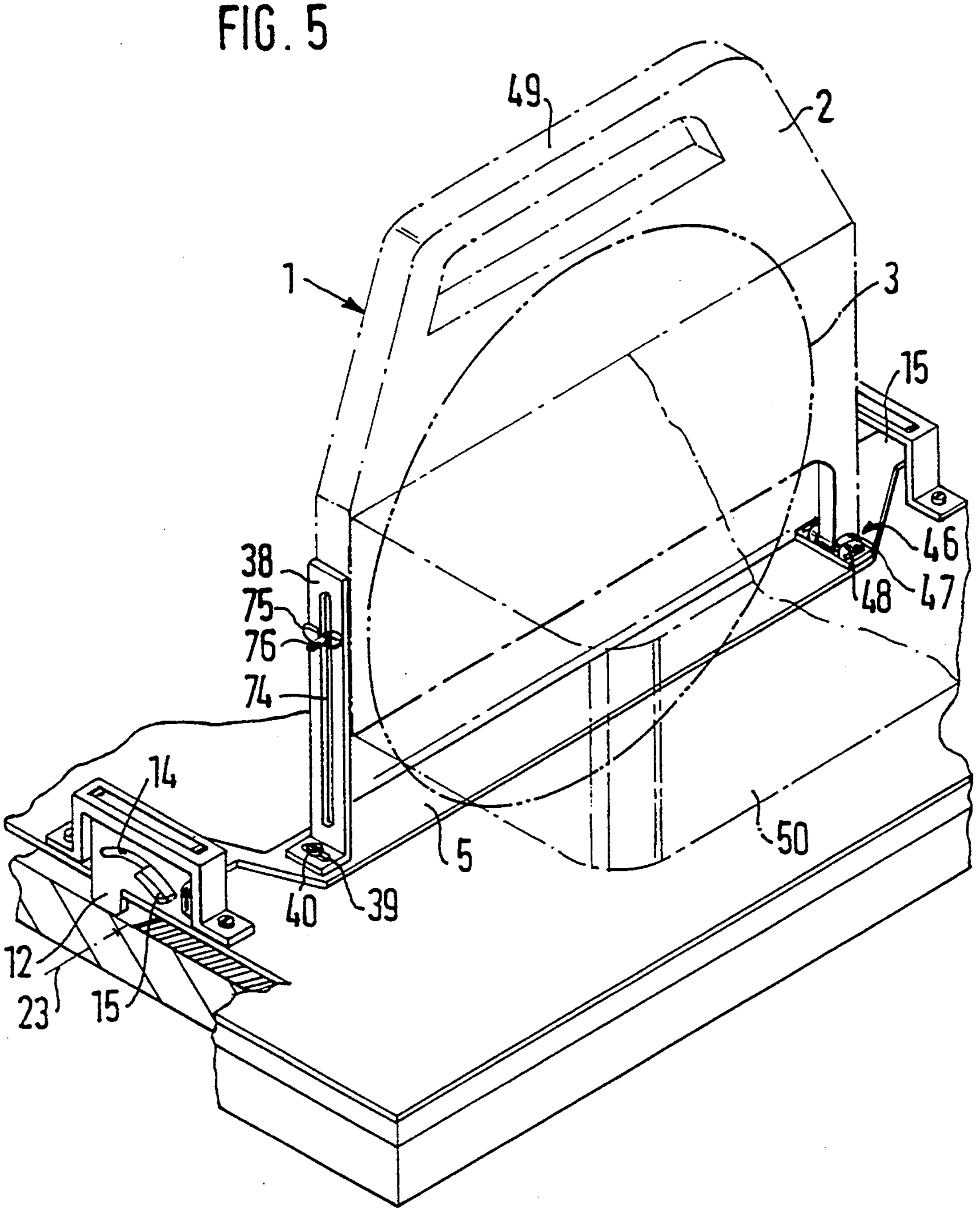
FIG. 5 is a view showing an example of a turning bridge with an adjusting device for compensation of tolerances.

FIG. 5 which schematically shows in a perspective view the embodiment of a hand circular saw 1 and illustrates also the construction of the adjusting mechanical device. With this adjusting device, independently of the position of the turning axis 23, a so-called ideal saw blade position can be obtained. The hand circular saw 1 with its interrupted and schematically shown housing 42 and handle 49 is supported on the turning bridge 5 by a pin bearing 46 so that it can be turned upwardly and downwardly. The pin bearing 46 is located in a bearing block 47, similarly to the embodiment shown in FIG. 3 is adjustably mounted on the turning bridge 5 by means of screws extending through elongated holes. At the side which is opposite to the pin bearing 46, a cutting depth adjusting arm 38 is arranged on the turning bridge 5 by means of screws 40 extending in an elongated hole 30, in a displaceable manner so that an angular displacement of the saw blade 3 is possible.

The housing 2 engages a pin 48 which acts as an axis and held in the pin bearing 46. The ends 15 of the turning bridge 5 are supported in a coulisse-like manner in the coulisse guide paths 14 of the guiding coulisse sheets 12. It can be seen that the housing 2 and thereby the saw blade 3 can move both in a vertical movement both for cutting depth change perpendicular to the turning bridge 5 and also with the turning bridge 5 in a movement turning the saw blade plane in the coulisse guiding paths 14 about the turning axis 23. The cutting depth guiding arm 38 has a central longitudinal groove 74. A threaded pin 76 fixedly connected with the housing to extend through the longitudinal groove and carries an adjusting screw 75. Thereby the respective desired cutting depth is adjustable.

Figure 6:
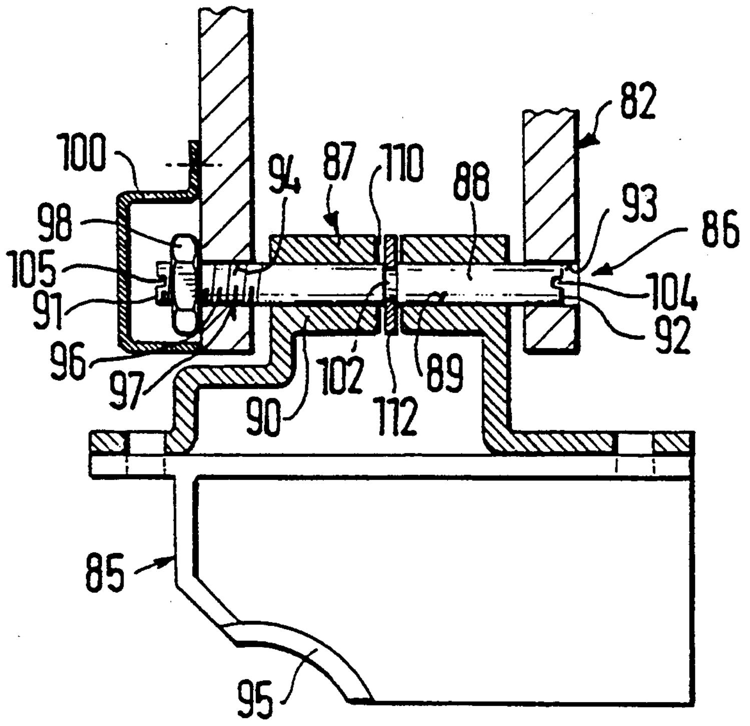
FIG. 6 is an enlarged section of the construction of the turning bridge of FIG. 5.

FIG. 6 shows a section of an embodiment of a bearing block 87 for a pin bearing 86. Here the turning bridge 85 can be clearly seen in a profile with-the coulisse block-like end 95. A part of the pin bearing 86 is formed by an opening 89 in the bearing block 87. A pin 88 extends through the opening 89. The ends 91, 92 of the pin 88 extend through two aligned openings 93, 94 of a housing 82 which surrounds the bearing block 87 in the region of the opening 89 in a fork-like manner. One of the openings 93, 94 carries an inner thread 96. The pin 88 with its outer thread 99 is screwed in it. A nut 98 is arranged on its outer side and secures the position of the house 82 from the pin 88. The nut 98 is covered together with the end of the pin 88 by a housing cover 100. The cover is mounted on the housing 82 by not shown screws. The pin 88 in its central region has an annular groove 102 for receiving a spring ring 112. The pin 88 at its ends 91, 92 is provided with slots 104, 105 for a blade of the screwdriver.

A slot 110 which is in alignment with the annular groove 102 of the pin 88 extends transversely to the opening 86 through the wall 90 of the bearing block 87. A spring ring 112 can be snapped through the slot 110 in the annular groove 102 of the pin 88. The bearing block 87 is mounted on the turning bridge 85 by not shown screws. During turning of the pin 88 the housing 82 moves parallel to the axis of the pin 99 depending on the rotary direction. Since the hand circular saw with the saw blade 83 is arranged on the housing 82, the saw blade 83 is adjustable relative to the turning bridge 85 and thereby to the coulisse and to the turning axis 63 in accordance with FIG. 5. The accuracy of the adjustment is controllable with conventional measurements during the end mounting of the circular saws. After the adjusting the ends 91, 92 are made unaccessible by suitable not shown locks.

Presumption for performing the above described adjustment is a minimization of the inclined position of the housing relative to the pin bearing by suitable manufacturing features such as for example simultaneous manufacture of parallel openings in the turning bridge or in the bearing block or in the housing, drilling in a common position in a single working step, reducing of the numbers of end members, etc.

In accordance with a not shown embodiment of the invention the distance of the turning axis relative to the base plate is increased by the value of thickness of the guiding rail and adjusted so as to be not changeable, so that during only working with guiding rails must be performed. For working without guiding rails, a removable, foot-like substrate is mounted under the base plate for thickness compensation. Here during working without the guiding rail and without the foot-like substrate a cutting depth gain is obtainable since the tool can penetrate deeper into the workpiece by the thickness value of the guiding rail. In the interest of cutting depth gain, an accuracy loss of the cutting line of sight and, with the turning angle deviating from 90°, insignificantly deviating cutting joint traces must be taken into account.

In accordance with a further not shown embodiment of the invention, a fine adjustment for the guiding coulisse sheet is provided perpendicular to the feed direction for especially accurate adjustment of the turning axis. This is performed for example in that the slider frame is screwed with the base plate by screws extending through elongated holes. With such saws the turning axle is usually 90° and 45° or in other words these saws are mainly designed so that they are turnably adjustable in this angular region. Their turning axis is defined by a cutting point which is located arbitrarily but preferably near the cutting joint, and with a ray which extends through the product-side cutting edge, which is open at an angle of inclination 67.5° to the vertical downwardly and extends away from the separating tool.

For hand circular saws which are provided for a turning angular region between 90° and 30°, the turning axis is determined by the cutting point with a geometrical ray extending through the product-side cutting edge and inclined at an angle of 60° to the vertical downwardly toward the refuse side.

Thus, in the turning angular regions from 90° to 45° and 90° to 30° a single cutting joint coinciding with the cutting line of sight can be produced so that the contours on the workpiece can be selected exactly to be constant in each angular position. This object is achieved in that the position of the turning axis is defined geometrically in a new manner. Thereby not only a cutting joint is produced which uniformly coincides with a cutting line of sight over all turning angles, but also the position of the turning axis relative to the base plate is maintained accurately so that the tool plate cannot collide with the guiding rail, but is secured very close to the best cutting suppression by the guiding rail. In this case a cutting line of sight for a not shown device for producing the brake lines with the cutting tool in accordance with the German document DE 743,056 is formed as auxiliary means efficiently simplifying the works.

It will be understood that each of the elements described above, or two or more together, may also find a useful application in other types of constructions differing from the types described above.

While the invention has been illustrated and described as embodied in a motor driven hand power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A motor-driven hand power tool, comprising a saw including a saw blade and means allowing movement of said saw blade about a non-physical tilting axis extending parallel to a cutting line of sight and fixing said saw blade in each turning position relative to a workpiece which is subdivided by a cutting joint into a product-side and a refuse-side with product and refuse-side cutting edges; a base plate over which said saw blade is positioned, said saw blade being arranged so that said tilting axis extends at a distance under a lower side of said base plate, said distance being dimensioned so that said tilting axis in a working position of the power tool is located under an upper surface of the workpiece in an interior of the workpiece; means for adjusting said tilting axis perpendicular to an upper surface of said base plate, said adjusting means including a displaceable guiding coulisse sheet; and a slider frame, said guiding coulisse sheet being vertically displaceable between two end positions such that one of said end positions is arrestable without the use of a guiding rail, while another of said end positions is arrestable with the use of a guiding rail.

2. A motor-driven hand power tool, comprising a saw including a saw blade and means allowing movement of said saw blade about a non-physical tilting axis extending parallel to a cutting line of sight and fixing said saw blade in each turning position relative to a workpiece which is subdivided by a cutting joint into a product-side and a refuse-side with product and refuse-side cutting edges; a base plate over which said saw blade is positioned, said saw blade being arranged so that said tilting axis extends at a distance under a lower side of said base plate, said distance being dimensioned so that said tilting axis in a working position of the power tool is located under an upper surface of the workpiece in an interior of the workpiece; turning guiding means including a part which is turnable relative to said base plate and formed as a turning bridge, said turning bridge supporting said saw blade in a position-adjustable manner; and a pin bearing, said saw being displaceable in said pin bearing so that said saw blade is adjustable in a parallel fashion, said pin bearing being adjustable so that said saw blade has a position which is secure from engagement from outside.

3. A hand power tool as defined in claim 2, wherein said saw blade is turnable in a turning angular region between 90° and 45°, said tilting axis intersecting a geometrical ray which extends through the product-side cutting edge and extends with a downwardly open angle of substantially 67.5° to a vertical in the cutting joint.

4. A hand power tool as defined in claim 2, wherein said saw blade has a turning angular region between 90° and 30°, said tilting axis intersecting a geometrical ray extending through the product-side cutting edge at a downwardly open angle of substantially 60° to a vertical in the cutting joint.

5. A hand power tool as defined in claim 2; and further comprising means for adjusting said tilting axis perpendicular to an upper surface of said base plate.

6. A hand power tool as defined in claim 5, wherein said adjusting means includes a displaceable guiding coulisse sheet.

7. A hand power tool as defined in claim 2; and further comprising guiding rail positionable on the workpiece; and a substrate releasably mountable on a lower side of said base plate and corresponding to a thickness of said guiding rail so as to operate without said guiding rail.

8. A hand power tool as defined in claim 1; and further comprising means for adjusting said tilting axis perpendicular to an upper surface of said base plate.

9. A hand power tool as defined in claim 8, wherein said adjusting means includes a displaceable guiding coulisse sheet.

10. A hand power tool as defined in claim 1, wherein said guiding coulisse sheet is arranged so that it is supportable on an upper surface of the workpiece; and further comprising means for arresting said guiding coulisse sheet in its end position relative to said base plate.

11. A hand power tool as defined in claim 10, wherein said means for arresting includes clamping means.

12. A hand power tool as defined in claim 11, wherein said clamping means includes an adjusting screw.

13. A hand power tool as defined in claim 1; and further comprising guiding rail positionable on the workpiece; and a substrate releasably mountable on a lower side of said base plate and corresponding to a thickness of said guiding rail so as to operate without said guiding rail.

14. A hand power tool as defined in claim 1; and further comprising turning guiding means including a part which is turnable relative to said base plate and formed as a turning bridge, said turning bridge supporting said saw blade in a position-adjustable manner.

15. A hand power tool as defined in claim 2; and further comprising a bearing block which is turnably mounted and supports said pin bearing.

16. A hand power tool as defined in claim 15, wherein said bearing block is turnable relative to said turning bridge.

17. A hand power tool as defined in claim 2; and further comprising a cutting depth guiding arm; and a saw housing, said saw housing having a side opposite to said pin bearing and guided on said cutting depth guiding arm.

18. A hand power tool as defined in claim 17; and further comprising means forming an elongated opening and at least one screw extending through said elongated opening and mounting said cutting depth guiding arm on said turning bridge.

* * * * *